United States Patent [19]
Yoo

[11] Patent Number: 5,957,802
[45] Date of Patent: Sep. 28, 1999

[54] APPARATUS FOR CHANGING ROTATION OF PEDAL SHAFT FOR BICYCLE

[75] Inventor: Moon-Soo Yoo, Chungcheongbuk-do, Rep. of Korea

[73] Assignee: World Industry Co., Ltd., Chungcheongbuk-do, Rep. of Korea

[21] Appl. No.: 09/093,914

[22] Filed: Jun. 9, 1998

[30] Foreign Application Priority Data

Jun. 9, 1997 [KR] Rep. of Korea ...................... 97-23667
May 20, 1998 [KR] Rep. of Korea ...................... 98-18195

[51] Int. Cl.$^6$ .............................. F16H 3/44; B62M 11/14
[52] U.S. Cl. ......................... 475/294; 475/297; 475/324; 475/12; 74/810.1; 280/236
[58] Field of Search ..................... 475/294, 296, 475/297, 323, 324, 326, 12; 74/810.1; 280/236, 237, 238

[56] References Cited

U.S. PATENT DOCUMENTS

| | | | |
|---|---|---|---|
| 355,672 | 1/1887 | Wuterich | 74/810.1 |
| 399,003 | 3/1889 | Bentley | 475/12 |
| 479,177 | 7/1892 | Vogel | 74/810.1 |
| 678,486 | 7/1901 | Head | 475/12 |
| 692,658 | 2/1902 | Head | 475/12 |
| 743,867 | 11/1903 | Head | 74/363 |
| 1,275,505 | 8/1918 | Veyret | 74/810.1 |
| 4,630,839 | 12/1986 | Seol | 280/236 X |
| 4,667,934 | 5/1987 | Ottemann | 74/810.1 X |
| 5,141,476 | 8/1992 | Chang | 475/297 |
| 5,368,279 | 11/1994 | Ottemann et al. | 74/810.1 X |
| 5,435,583 | 7/1995 | Foster, Jr. | |
| 5,647,817 | 7/1997 | Chang | 475/297 X |

FOREIGN PATENT DOCUMENTS

| | | | |
|---|---|---|---|
| 0 369 925 | 11/1989 | European Pat. Off. | |
| 97-42078 | 7/1997 | Rep. of Korea | |
| 207446 | 11/1923 | United Kingdom | 475/12 |
| 97/21587 | 6/1997 | WIPO | |
| 98/29297 | 7/1998 | WIPO | |

Primary Examiner—Charles A Marmor
Assistant Examiner—Scott Lund
Attorney, Agent, or Firm—Lowe Hauptman Gopstein Gilman & Berner

[57] ABSTRACT

An apparatus for changing rotation of a pedal shaft for a bicycle is provided, in which forward and rearward driving forces of the pedal shaft are convertible without a load, by indirect coupling, and the bicycle can be pulled rearward under the setting conditions for forward traveling. The apparatus includes: a sprocket housing installed to be freely rotatable centering the pedal shaft, to which a ring gear and a ratchet changing ring having the first one-way stoppers are fixed; a sun gear installed to be integrally rotatable with the pedal shaft; rearward rotation of the carrier can be checked by the first one-way stoppers of the ratchet changing ring; a changing gear ring coupled with the carrier to be elastically rotatable along the circumference with predetermined rotatable angle; a fixing housing having the second one-way stoppers capable of stopping rearward rotation of the carrier; and a stopper changing ring capable of controlling the second one-way stoppers of the fixing housing.

5 Claims, 13 Drawing Sheets

5,957,802

APPARATUS FOR CHANGING ROTATION OF PEDAL SHAFT FOR BICYCLE

TECHNICAL FIELD

The present invention relates to an apparatus for changing rotation of a pedal shaft for a bicycle, which can travel the bicycle forward when pedaling the bicycle forward or rearward, and more particularly, to an apparatus for changing rotation of a pedal shaft for a bicycle, in which stoppers operated by a rider using an operating lever are installed in a fixing housing and the stoppers control a changing gear ring such that a carrier for changing forward and rearward driving forces of a pedal shaft can be controlled, so that the forward and rearward driving force of the pedal shaft can control the carrier through indirect coupling, and the bicycle can be pulled rearward without a load, with the operating lever is in position.

BACKGROUND ART

An apparatus for changing rotation direction of pedal shaft for a bicycle, capable of traveling forward the bicycle when pedaling the bicycle forward or rearward, has been disclosed. In particular, typical examples thereof are disclosed by Mantzoursos et al. and Foster.

According to the invention of Mantzoursos et al. (EPO Publication No. 0 369 925, published on May 23, 1990), two gears having a one way mechanism are fixed to pedal shaft and a drive switching gear is installed between above two gears, which is detachable.

Thus, when the drive switching gear is engaged with above two gears, whether the axis of pedals is rotated forward or rearward, a sprocket wheel rotates forward.

According to the invention of Foster (U.S. Pat. No. 5,435,583), a gear box is installed on a pedal shaft, in which two gears, a clutch assembly located on a shaft between two gears, and a bevel gear which is placed between both two gears are installed. Here, the bicycle of this invention can travel like a general bicycle by pedaling with the clutch disk is coupled with the right gear. However, when pedaling rearward with the clutch disk is coupled with the left gear, the rotation direction is changed by the bevel gear, so that the bicycle travels forward.

The above two inventions are meaningful in the aspect of the bi-directional pedaling apparatus which can drive the bicycle forward when pedaling rearward by adopting a drive switching portion. However, the life span of the bi-directional pedaling apparatus becomes short due to abrasion of a specific portion on which a force required for changing the power direction is concentrated.

By making up such weak points, the present inventor has disclosed an apparatus for changing power direction for a bicycle in the Korean Patent Publication No. 97-42078(PCT Publication No. WO 97/21587, published on Jun. 19, 1997).

According to the apparatus for changing power direction for a bicycle, a shaft housing, which supports a pedal shaft, has an opening portion, and first pawls are installed along inner circumference of the opening portion, a changing ring has holes along the circumference and has a inner gear, a carrier has planetary gears, inner ratchet teeth, and outer ratchet teeth, a sun gear, which is fixed to the pedal shaft, has second pawls engaged with the inner ratchet teeth, is engaged with the planetary gears, a sprocket cap has inner gear portion, which is engaged with the planetary gears, and a first gear which is engaged with the inner gear of the changing ring, rotates the changing ring with predetermined angle, so that control the first pawls.

In the state of the first pawls are not engaged with outer ratchet teeth of the carrier, the apparatus can travel a bicycle forward by pedaling forward, and idle the bicycle by pedaling rearward like a conventional bicycle.

When the pedal shaft rotates forward in this state, the sun gear rotates forward which is fixed to the pedal shaft, then the second pawls of the sun gear is engaged with the inner ratchet teeth, the carrier rotates. And the planetary gears of the carrier are engaged with inner gear portion of the sprocket cap, then, the sprocket rotates forward. Therefore, the rear wheel of the bicycle rotates forward.

In the other hand, when the pedal shaft rotates rearward in this state, the second pawls are not engaged with the inner ratchet teeth of the carrier, then, the pedal is idled.

In the state of the first pawls are engaged with outer ratchet teeth of the carrier, the apparatus can travel a bicycle forward whether pedaling forward or rearward.

In this state, when the pedal shaft rotates forward, the rear wheel of the bicycle rotates forward the same operation of the first pawls are not engaged case.

In the other hand, when the pedal shaft rotates rearward in this state, the carrier is fixed to shaft housing because the outer ratchet teeth of the carrier is engaged with the first pawls, the planetary gears of the carrier rotates the inner gear portion of the sprochet cap, then the rear wheel of the bicycle forward.

But, the bicycle is pulled rearward in this state, the rearward driving force of the sprocket, to which connected to the sprocket cap, is to rotate the planetary gears, and the planetary gears drive the sun gear forward, then the pedal shaft rotates rearward.

As a result, there is no function that the bicycle can be pulled rearward without a load in that apparatus.

DISCLOSURE OF THE INVENTION

It is an objective of the present invention to provide an apparatus for changing rotation of the pedal shaft for a bicycle, when a bicycle is pulled rearward, the rearward driving force of the sprocket housing of the driving chain sprocket, operates the carrier and the changing ring, so that the operation control the first and second one-way stoppers, the pedal shaft rotates rearward, then the bicycle can be pulled rearward without a load.

BEST MODE FOR CARRYING OUT THE INVENTION

Figure 1:
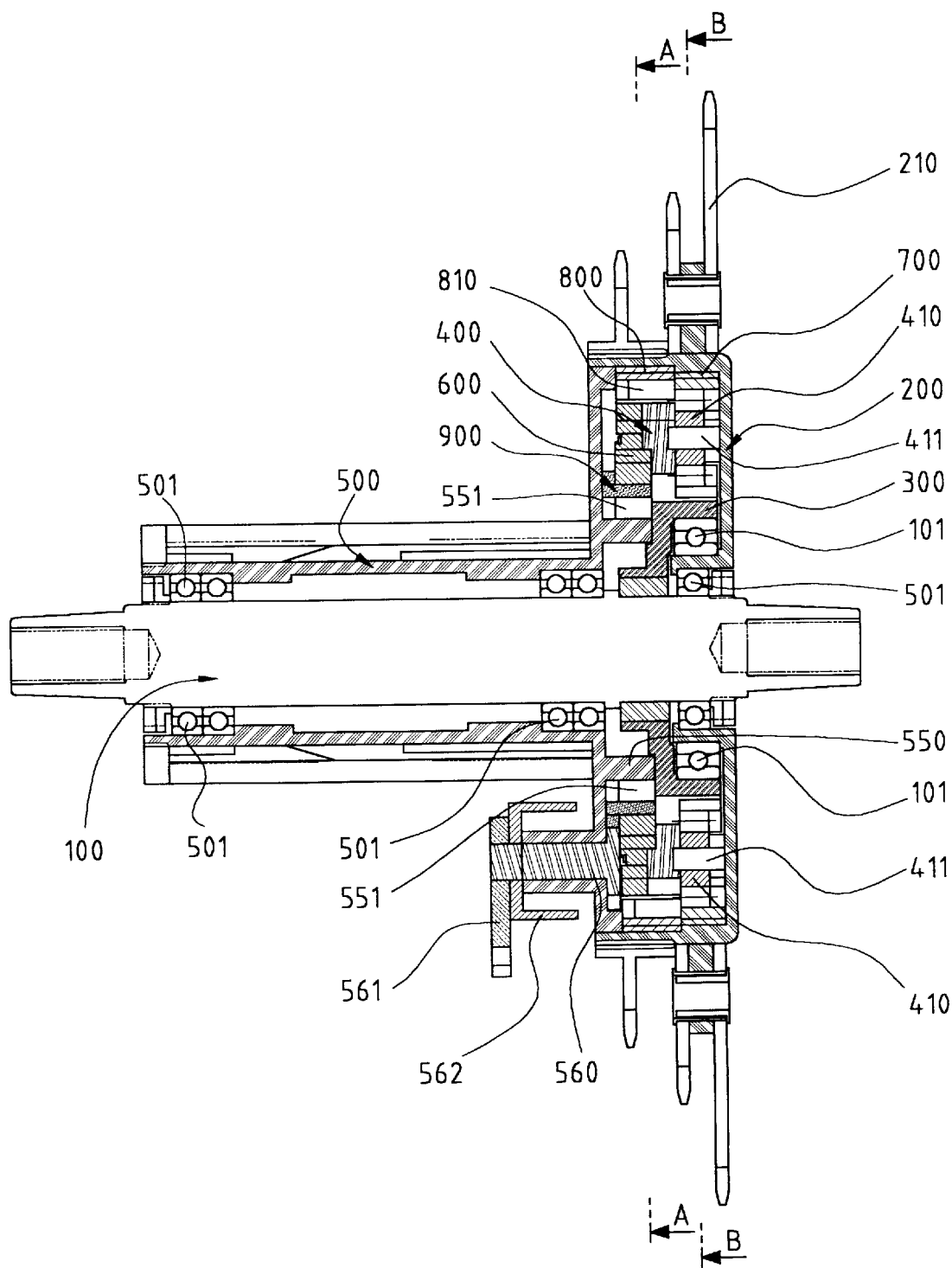
FIG. 1 is a section view showing an apparatus for changing rotation of a pedal shaft for a bicycle according to a preferred embodiment of the present invention.

As shown in FIG. 1, a sun gear 300 is fixed to a pedal shaft 100 by fixing means such as spline.

Also, a fixing housing 500, a sprocket housing 200 to which a driving chain sprocket 210 is fixed, a carrier 400 in which planetary gears 410 are mounted, a changing gear ring 600 and a stopper changing ring 900 are rotatably installed on the pedal shaft 100.

The fixing housing 500 and the sprocket housing 200 are rotatably connected with the pedal shaft 100 by bearings 101 and 501.

Figure 2:
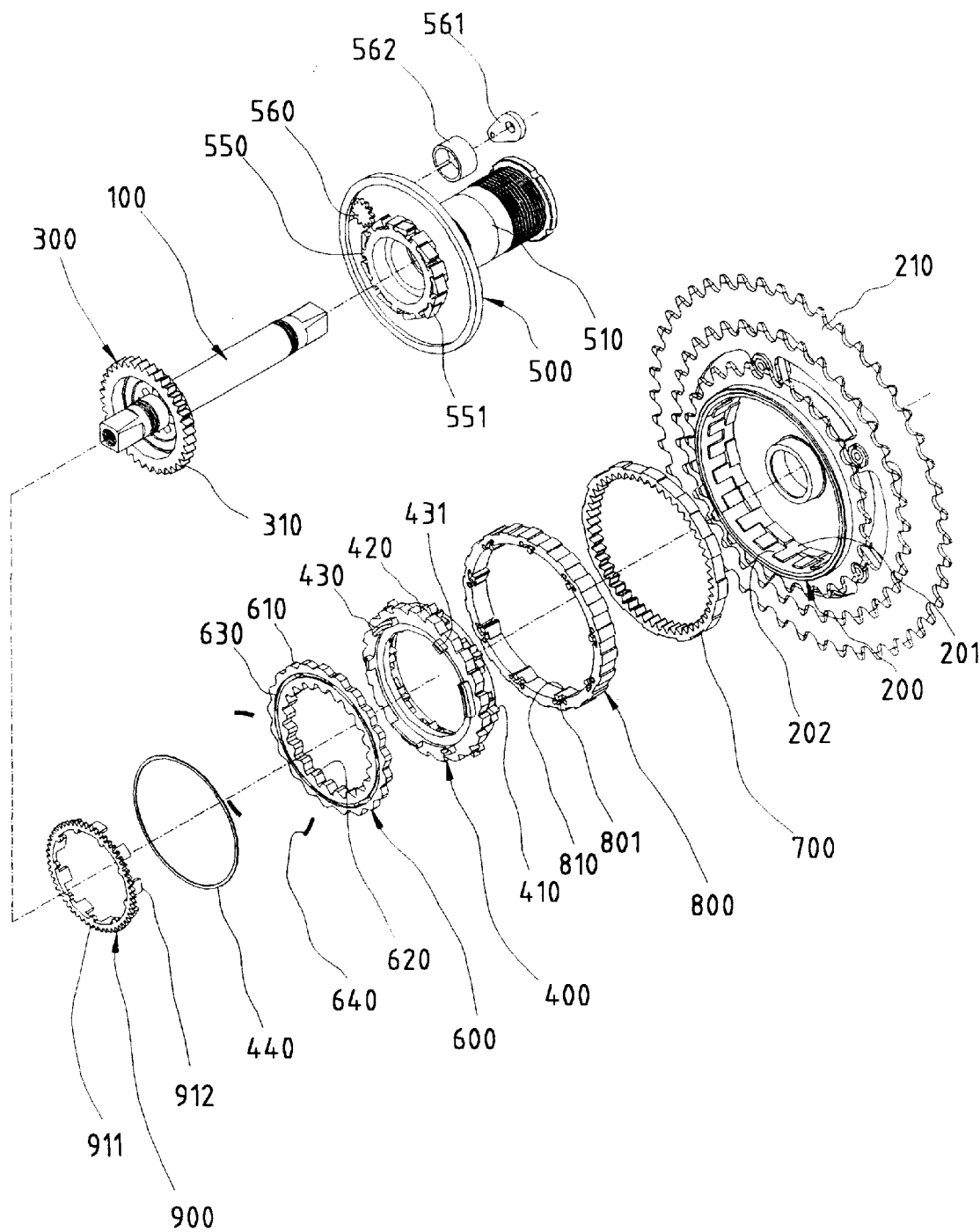
FIG. 2 is an exploded perspective view showing the major parts of the apparatus shown in FIG. 1.

As shown in FIG. 2, ring fixing portions 201 and 202, having a spline-like jagged portion, are formed along the inner circumference of the sprocket housing 200.

A ring gear 700 is fixed to the inner circumference of the ring fixing portion 201, and the planetary gears 410 of the carrier 400 to be described later are driven with being engaged with the ring gear 700.

Also, a ratchet changing ring 800 to which the first one-way stoppers 810 are mounted is fixed to the ring fixing portion 202.

Figure 3:
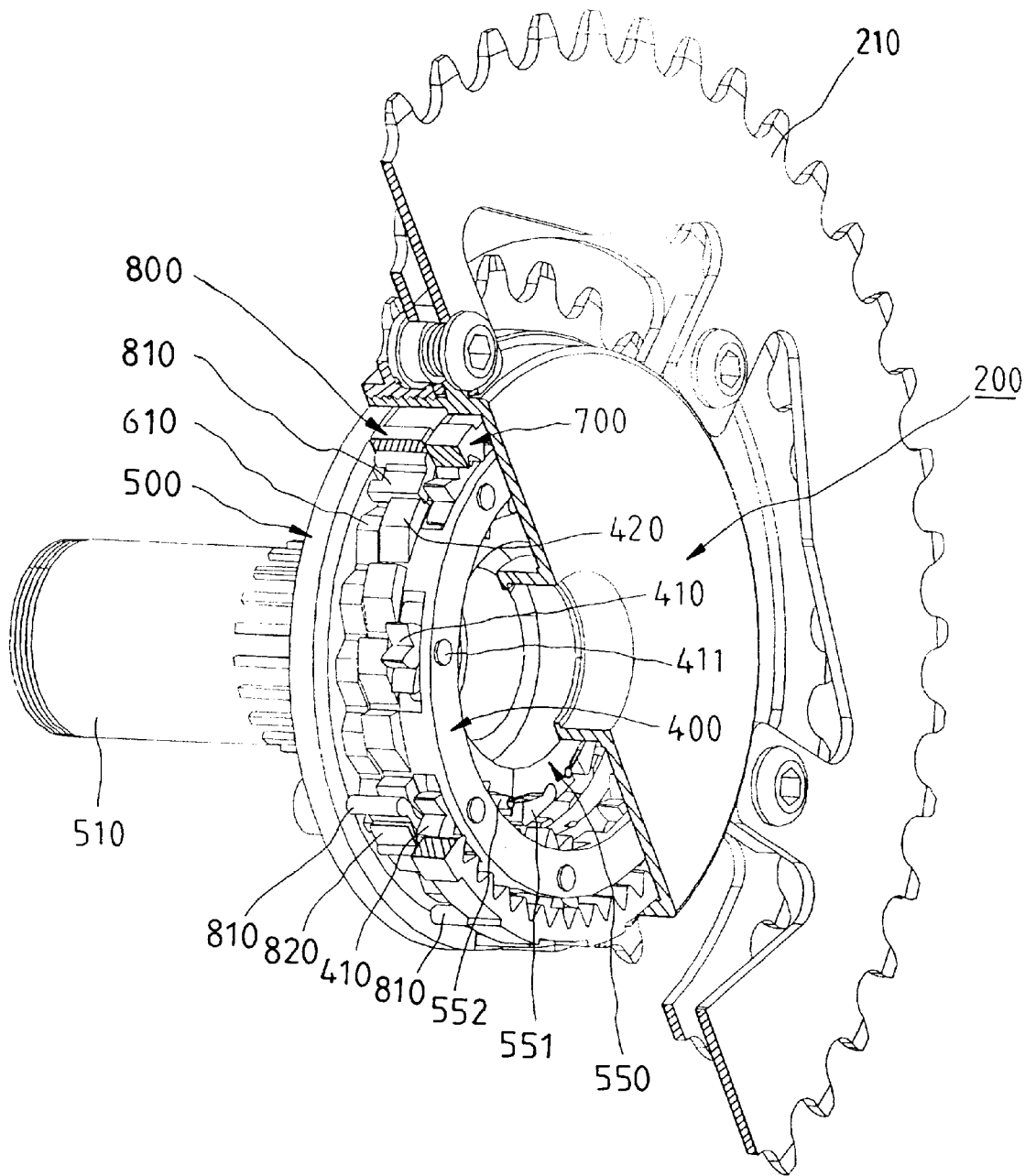
FIG. 3 is a partial perspective section view showing the coupling state of the apparatus for changing rotation of the pedal shaft for a bicycle according to the present invention.

The first one-way stoppers 810 of the ratchet changing ring 800 are elastically entangled with ratchet teeth 420 of the carrier 400 and an outer ratchet teeth portion 610 of the changing gear ring 600 as shown in FIG. 3.

The planetary gears 410 are installed along the circumference of the carrier 400 to be rotatable by fixing shafts 411.

Also, the planetary gears 410 of the carrier 400 are driven with being engaged with the ring gear 700 of the sprocket housing 200 and a gear portion 310 of the sun gear 300.

Also, the carrier 400 is installed between the ratchet changing ring 800 of the sprocket housing 200 and the sun gear 300.

Also, the ratchet teeth 420 are formed along the outer circumference of the carrier 400, and the first one-way stoppers 810 of the ratchet changing ring 800 of the sprocket housing 200 are entangled with the ratchet teeth 420 as shown in FIGS. 4A, 4B, 5, 9A and 10A.

The second one-way stoppers 551 of the fixing housing 500 can be entangled with the ratchet teeth 450 of the carrier 400.

As shown in FIG. 2, circular protrusions 430 having predetermined length along the circumference are formed at the side at the same intervals, and the circular protrusions 430 are coupled with circular slots 630 which are formed at the side of the changing gear ring 600 at the same intervals.

The circular protrusions 430 and the coupling projections 431 are formed along the circumference in one side of the carrier 400 alternatively at the same interval.

Also, coil springs 640 are installed in the circular slots 630 of the changing ring gear 600, and simultaneously a ring washer 440 is coupled with the circular protrusions 430 and coupling projections 431 of the carrier 400 to prevent the coil springs 640 from being seceded from the circular slots 630.

Thus, the carrier 400 and the changing gear ring 600 are elastically coupled to be rotatable along the circumferences thereof with predetermined rotatable angle.

Next, the fixing housing 500 fixed to a bicycle frame (not shown) will be described.

The fixing housing 500 has a cylindrical shape having an opening as shown in FIGS. 1, 2, 3, 7 and 8, and the sprocket housing 200 is coupled with the opening.

Also, splines and screws are formed at the outer circumference of a cylindrical portion 510 of the fixing housing 500, and the cylindrical portion 510 is fixed to the bicycle frame by a coupling means such as cylindrical nut, washer and nut.

Figure 8:
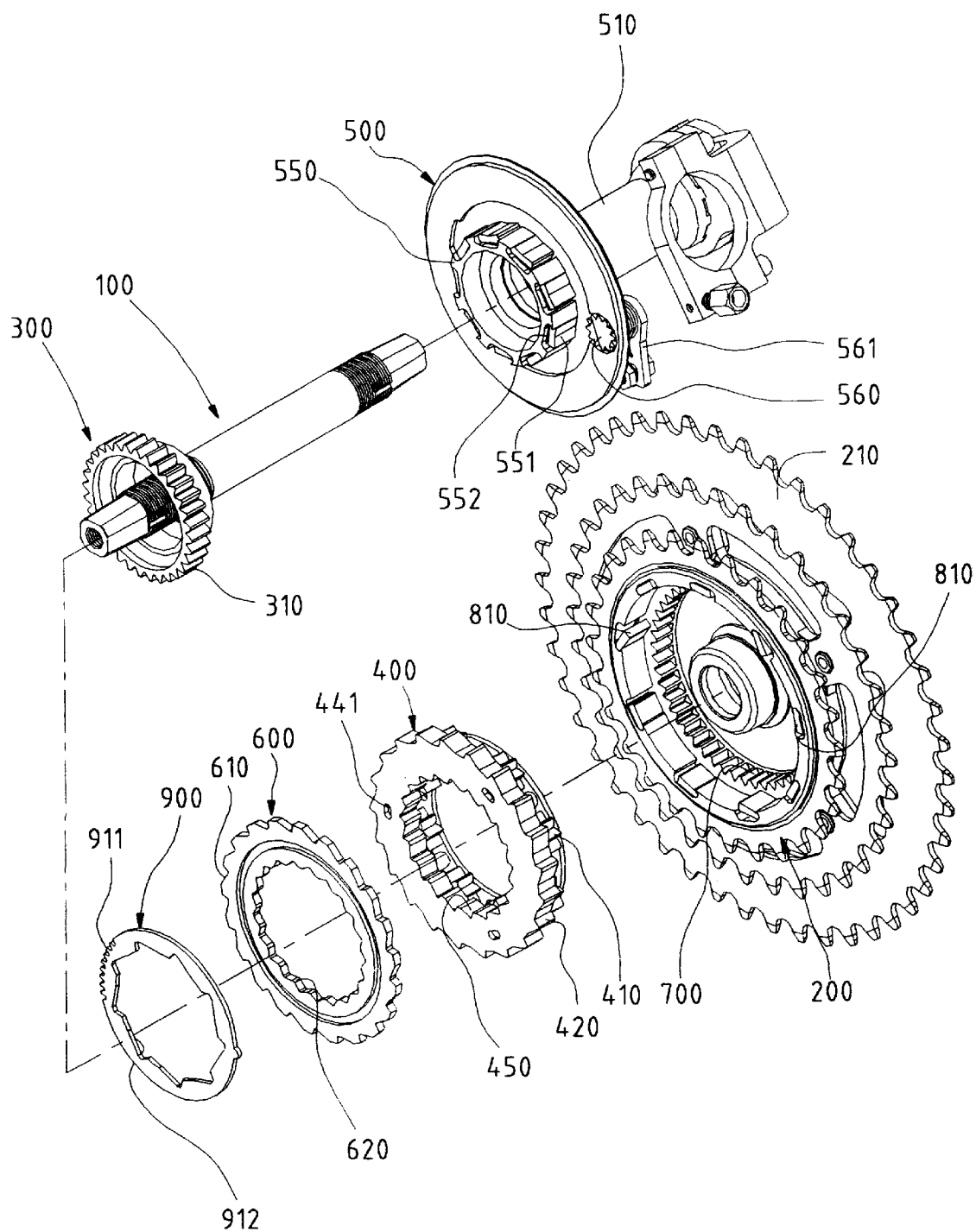
FIG. 8 is an exploded perspective view showing the major parts of the apparatus shown in FIG.7.

Also, stopper seat 550 having a flange shape are integrally formed along the inner circumference of a circular plate portion of the fixing housing 500 as shown in FIGS. 2 and 8, and grooves are formed in the stopper seat 550.

The second one-way stoppers 551 are elastically installed in the grooves of the stopper seat 550 by torsion springs 552, such that elasticity is applied toward the outside of the circumference of the stopper seat 550.

A lever gear 560 which operates in connection with a changing lever 561 whose operation is controlled from the outside, e.g., a handle of the bicycle, via a connecting means such as wire, is rotatably coupled at one side of the circular plate portion of the fixing housing 500. Also, the lever gear 560 can rotate the stopper changing ring 900 with predetermined angle.

As shown in FIGS. 1, 2, 4 and 5, the stopper changing ring 900 is installed at the outer circumference of the stopper seat 550 of the fixing housing 500, and an annular gear portion 911 is formed at the outer circumference of the stopper changing ring 900 to be rotatable with being engaged with the lever gear 560 coupled with the changing lever 561.

In one side of the stopper changing ring 900, holding portions 912, which are protruded perpendicular to the plane of the stopper changing ring 900, are formed together with the annular gear portion 911.

The holding portions 912 of the stopper changing ring 900 can be controlled by rotation of the stopper changing ring 900, lest the second one-way stoppers 551 of the fixing housing 500 couple with the inner ratchet teeth portion 620 of the changing gear ring 600.

The holding portions 912, which is formed at the inner circumference of the stopper changing ring 900, can control the second one-way stoppers 551 of the fixing housing 500 in order not to be coupled with the inner ratchet teeth portion 620 of the changing gear ring 600.

As described above, the lever gear 560 is engaged with the annular gear portion 911 of the stopper changing ring 900, thereby rotating the stopper changing ring 900 to shift its position.

As a result of the shift in position of the stopper changing ring 900, the holding portions 912 of the stopper changing ring 900 can control the second one-way stoppers 551 of the fixing housing 500 as shown in FIGS. 4A, 5, 9A, 9B, 10A and 10B.

That is, the second one-way stoppers 551 of the fixing housing 500 can control the rotation of the changing gear ring 600 with being entangled with or released from the inner ratchet teeth portion 620 of the changing gear ring 600.

As described above, the changing gear ring 600 has the inner ratchet teeth portion 620 and the outer ratchet teeth portion 610, and the circular slots 630 having predetermined length, at the side thereof at the same intervals.

The circular protrusions 430 of the carrier 400 are coupled with the circular slots 630 of the changing gear ring 600, such that the carrier 400 can rotate with predetermined angle, with being coupled with the changing rear ring 600 as shown in FIGS. 2, 4A, 4B, and 5.

Also, the second one-way stoppers 551 of the fixing housing 500 are engaged with or released from the inner ratchet teeth portion 620 of the changing gear ring 600, as described above.

The first one-way stoppers 810 of the ratchet changing ring 800 are engaged with the outer ratchet teeth portion 610 of the changing gear ring 600.

In particular, the outer ratchet teeth portion 610 of the changing gear ring 600 has approximately the same radius as that of the ratchet teeth 420 of the carrier 400, and has a gentle slope compared with the ratchet teeth 420 of the carrier 400.

The first one-way stoppers 810 of the ratchet changing ring 800 are elastically coupled with the outer ratchet teeth portion 610 of the changing gear ring 600 and the ratchet teeth 420 of the carrier 400, so that the first one-way stoppers 810 prevent the changing ring 600 and the carrier 400 from rotating rearward.

The stopper seats 801 in which the first one-way stoppers 810 can be mounted are formed at the same intervals along the inner circumference of the ratchet changing ring 800.

The first one-way stoppers 810 are elastically installed in the stopper seats 801 by torsion springs 820.

Because the first one-way stoppers 810 are coupled with the stopper seats 801 of the ratchet changing ring 800, protrude elastically against the stopper seats 801, the first one-way stoppers 810 can maintain coupling with the ratchet teeth 420 of the carrier 400 and the outer ratchet teeth portion 610 of the changing gear ring 600.

Another embodiment of the present invention will be described as followings in the FIG. 7 through FIG. 11.

As shown in FIG. 8, a ring gear 700 and a ratchet changing ring 800 can be directly formed along the inner circumference of the sprocket housing 200.

Ratchet teeth 450 are formed along the inner circumference of a carrier 400.

As shown in FIG. 8, slits 441 having predetermined length are formed at the side of the carrier 400 along the circumference at the same intervals, and protrusions 650 formed at the side of the changing gear ring 600 at the same intervals are coupled with the slits 441.

The annular gear portion 911 is partially formed in the stopper changing ring 900, such that the lever gear 560 of the changing lever 561 is driven with being engaged with the annular gear portion 911.

Also, the holding portions 912 are formed at the inner circumference of the stopper changing ring 900 with saw-tooth shape.

Hereinafter, the operation of the apparatus for changing rotation of a pedal shaft for a bicycle according to the present invention will be described.

When the pedal shaft 100 is driven forward in the state when the changing lever 561 is out of position, the bicycle can travel forward. Meanwhile, when the pedal shaft 100 is driven rearward in the state, the bicycle idles. This is the same function as that of a general bicycle.

Figure 4A:
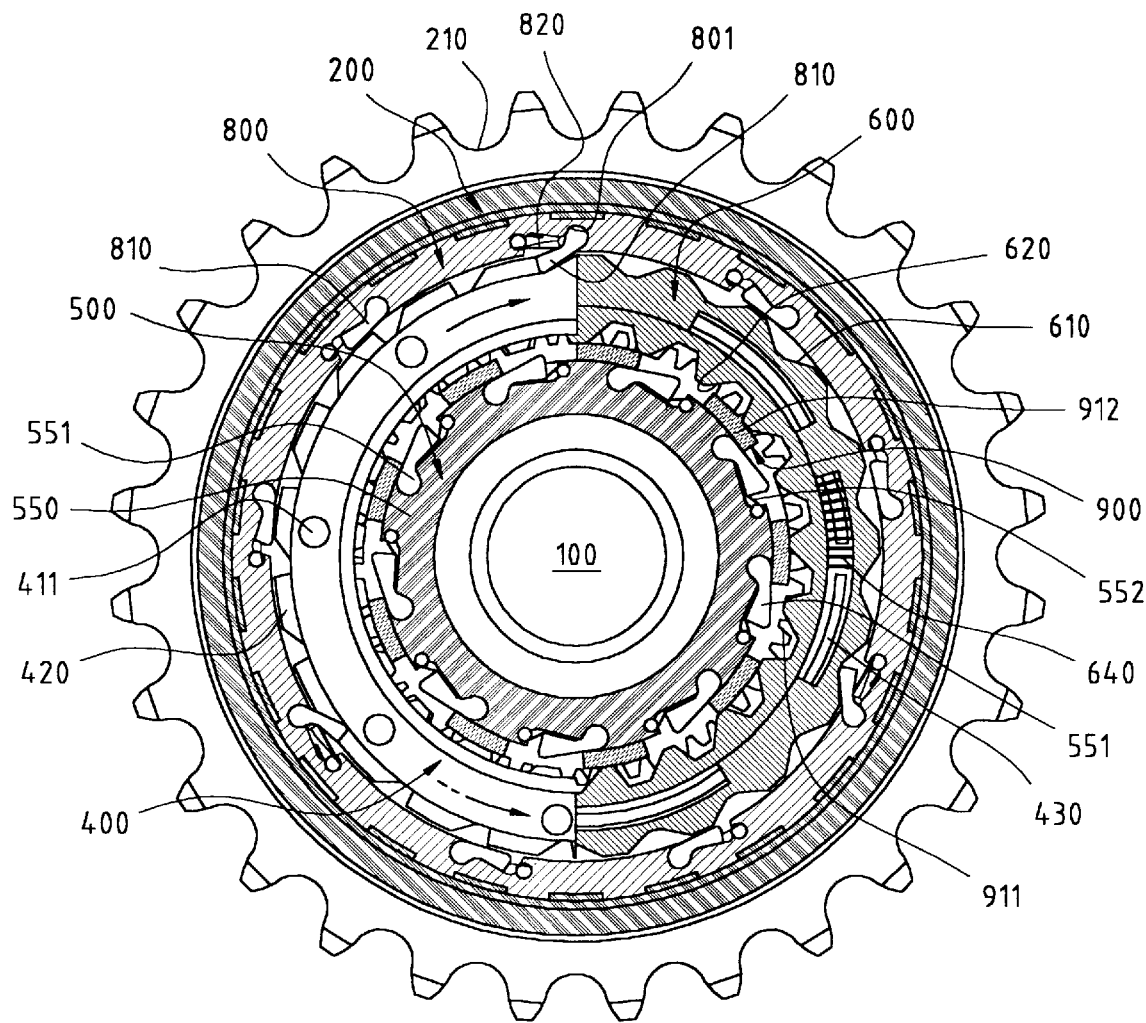
FIG. 4A is a partially opened section view cut along line A—A of FIG. 1, showing the state where a changing lever of the apparatus shown in FIG. 1 is out of position.
Figure 9A:
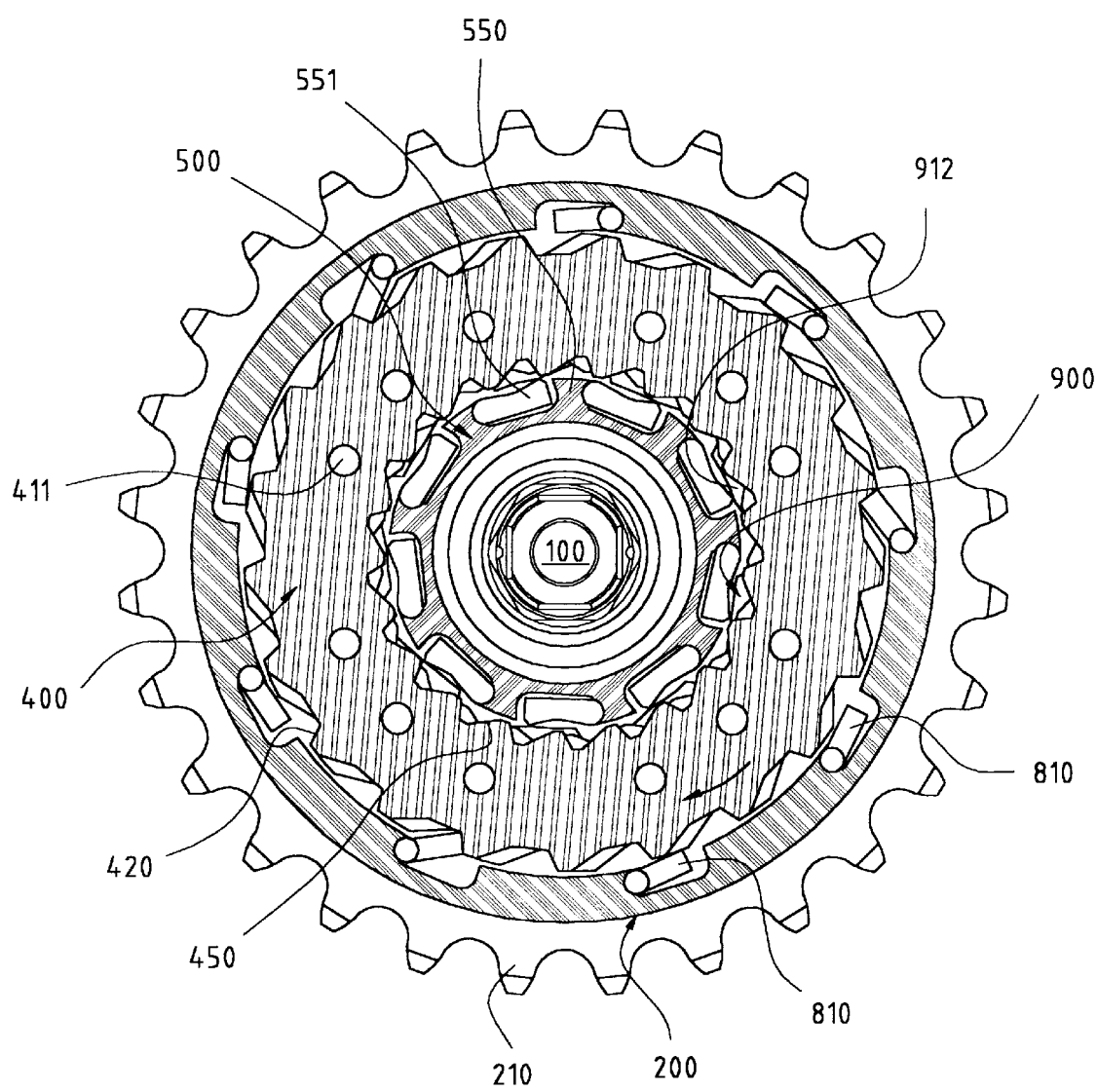
FIGS. 9A and 9B are section views cut along line C—C of FIG.7, showing the state where a changing lever of the apparatus shown in FIG.7 is out of position.
Figure 9B:
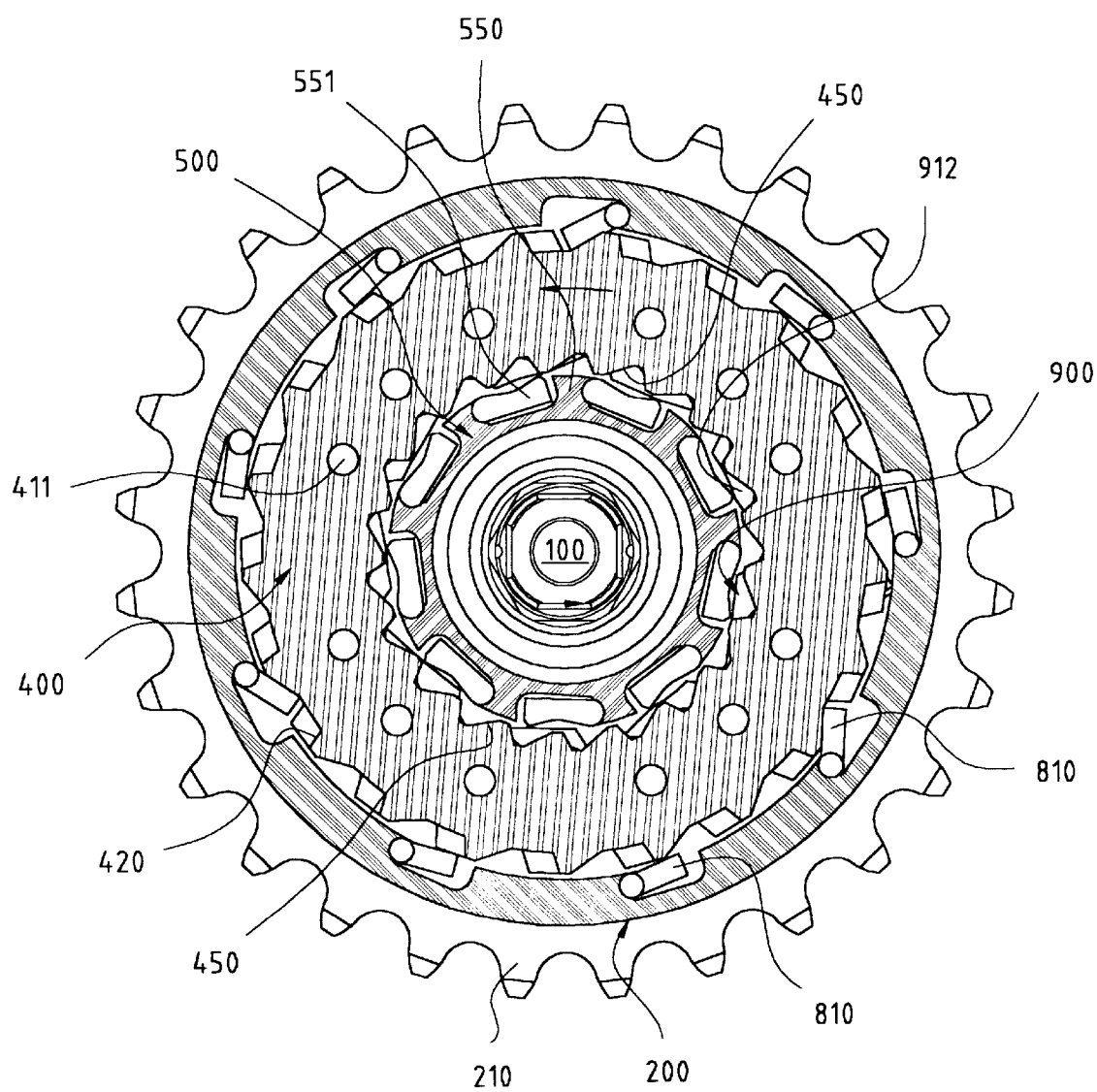

That is, when the changing lever 561 is out of position, the lever gear 560 connected with the changing lever 561 drives the annular gear portion 911 of the stopper changing ring 900, so that the holding portions 912 of the stopper changing ring 900 press the second one-way stoppers 551 of the fixing housing 500 as shown in FIGS. 4A, 9A and 9B.

As a result, the second one-way stoppers 551 of the fixing housing 500 are released from the inner ratchet teeth portion 620 of the changing gear ring 600.

As shown in FIGS. 9A and 9B, the second one-way stoppers 551 of the fixing housing 500 are released from the ratchet teeth 450 formed inside the carrier 400.

When the pedal shaft 100 is driven forward in this state, the sun gear 300 rotates forward together with the pedal shaft 100.

Thus, the sun gear 300 rotates forward the carrier 400 together with the changing gear ring 600 with being engaged with the planetary gears 410 of the carrier 400.

Figure 4B:
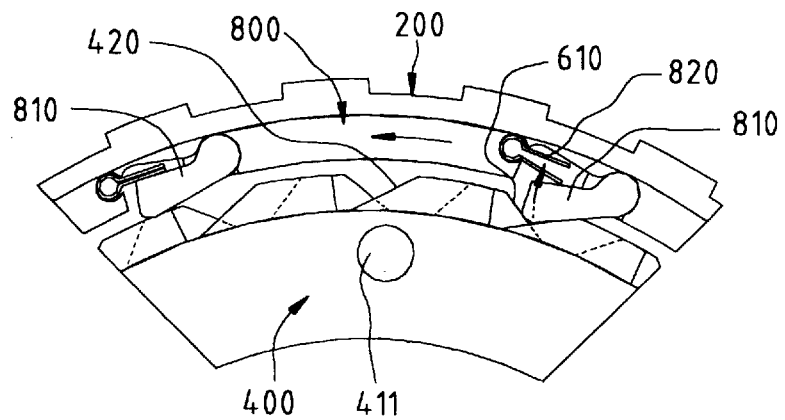
FIG. 4B is partial view of the FIG. 4A, showing a ratchet teeth portion of a changing gear ring with gentle grade of both direction.

That is, because the first one-way stoppers 810 of the ratchet changing ring 800 of the sprocket housing 200 are entangled with the ratchet teeth 420 of the carrier 400 and the outer ratchet teeth portion 610 of the changing gear ring 600 as shown in FIGS. 4A, 4B, and 9A, the sun gear 300 rotates the carrier 400 forward with being engaged with the planetary gears 410 of the carrier 400.

Here, the forward rotation of the carrier 400 rotates the ratchet changing ring 800 of the sprocket housing 200 forward, so that the driving force is transferred to the rear wheel connected to the driving chain sprocket 210 of the sprocket housing 200 by a chain, thereby traveling the bicycle forward.

Meanwhile, when the pedal shaft 100 is driven rearward, the sun gear 300 integrated with the pedal shaft 100 transfers rearward rotation force to the carrier 400 with being engaged with the planetary gears 410 of the carrier 400.

Here, when the carrier 400 rotates in a dotted arrow direction of FIG. 4A, and in the arrow direction of FIG. 9B, the ratchet teeth 420 of the carrier 400 and the outer ratchet teeth portion 610 of the changing gear ring 600 slide against the first one-way stoppers 810 of the ratchet changing ring 800 of the sprocket housing 200.

Thus, the planetary gears 410 of the carrier 400 perform a rolling motion together with the ring gear 700 of the sprocket housing 200 without a load.

This provides the same function as the idling of the pedal when pedaling a conventional bicycle rearward.

Meanwhile, when the changing lever 561 is in position, the bicycle can travel forward even though forward or rearward driving force is provided to the pedal shaft 100.

Figure 5:
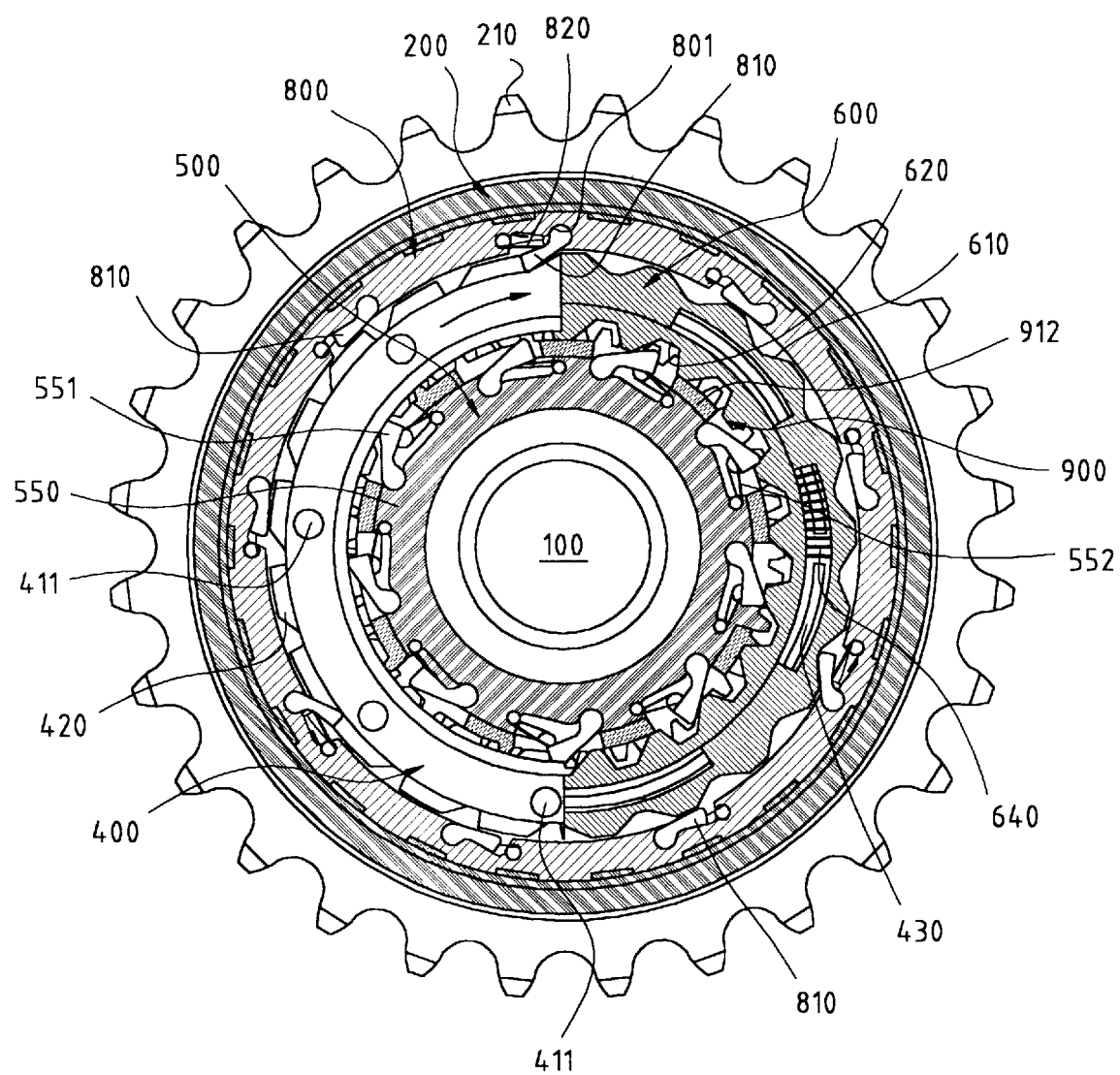
FIG. 5 is a partially opened section view cut along line A—A of FIG. 1, showing the state where the changing level of the apparatus shown in FIG. 1 is in position.
Figure 6:
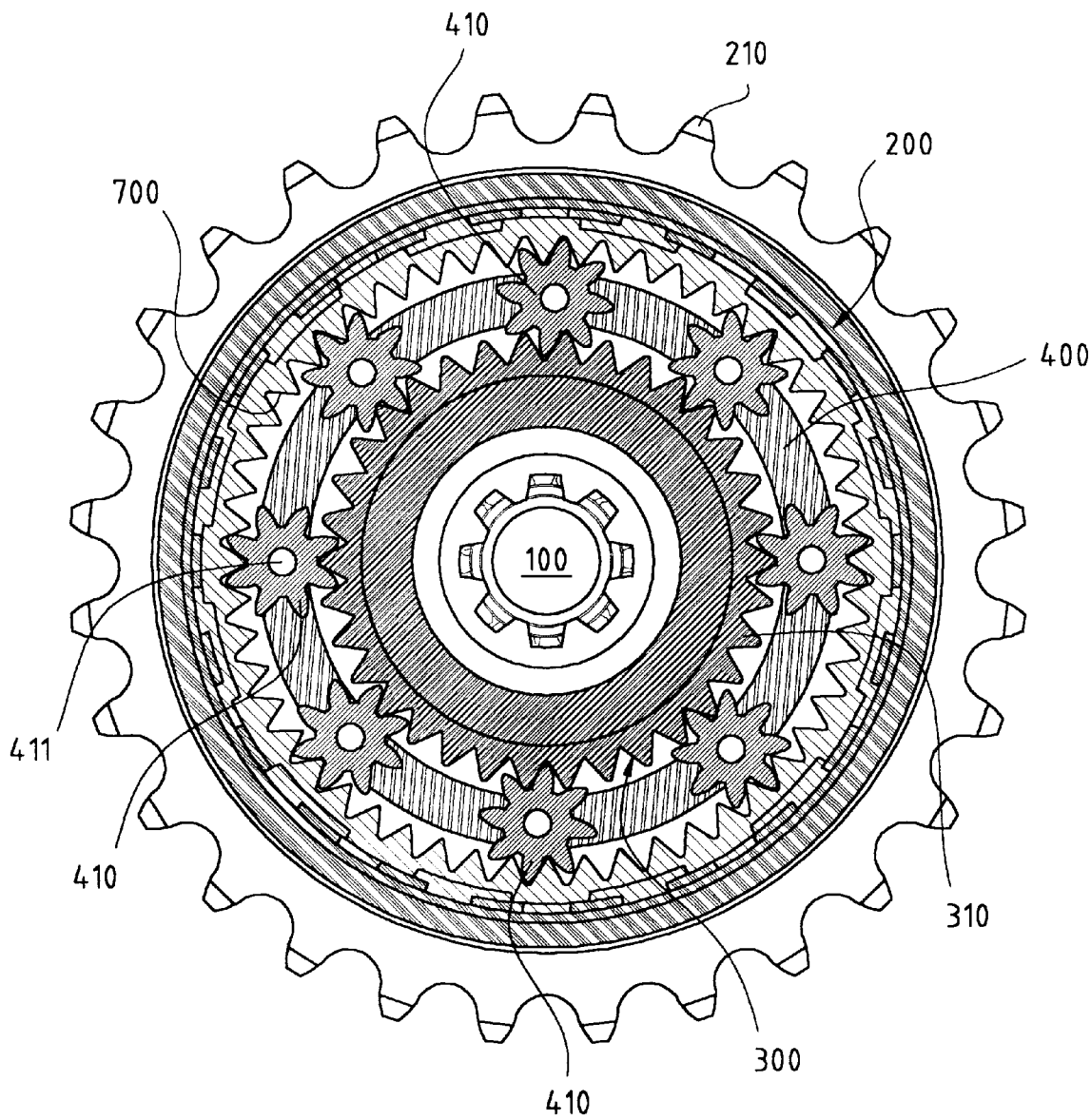
FIG. 6 is a section view cut along line B—B of FIG. 1.
Figure 10A:
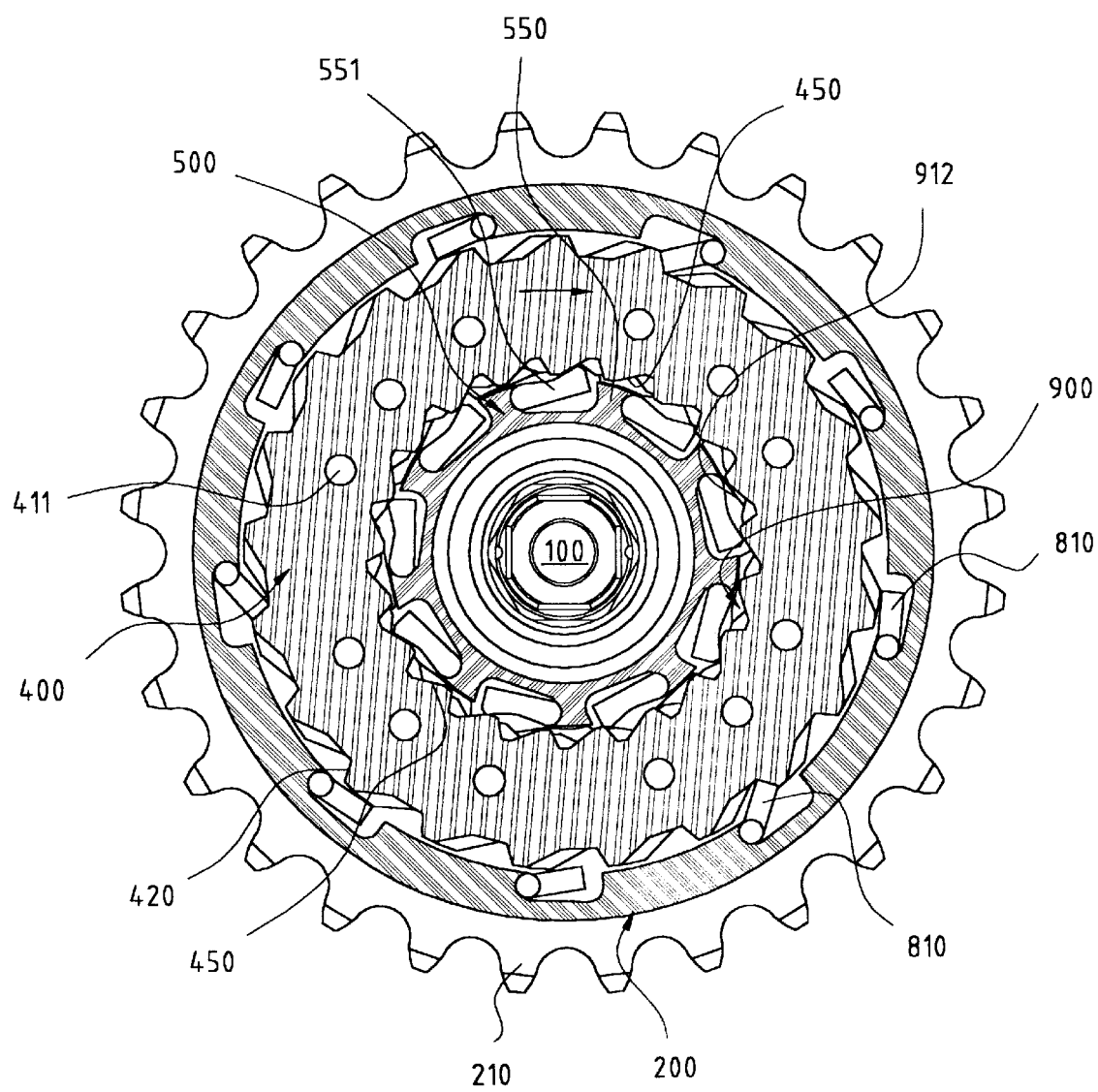
FIGS. 10A and 10B are section views cut along line C—C of FIG.7, showing the state where the changing lever of the apparatus shown in FIG.7 is in position.
Figure 10B:
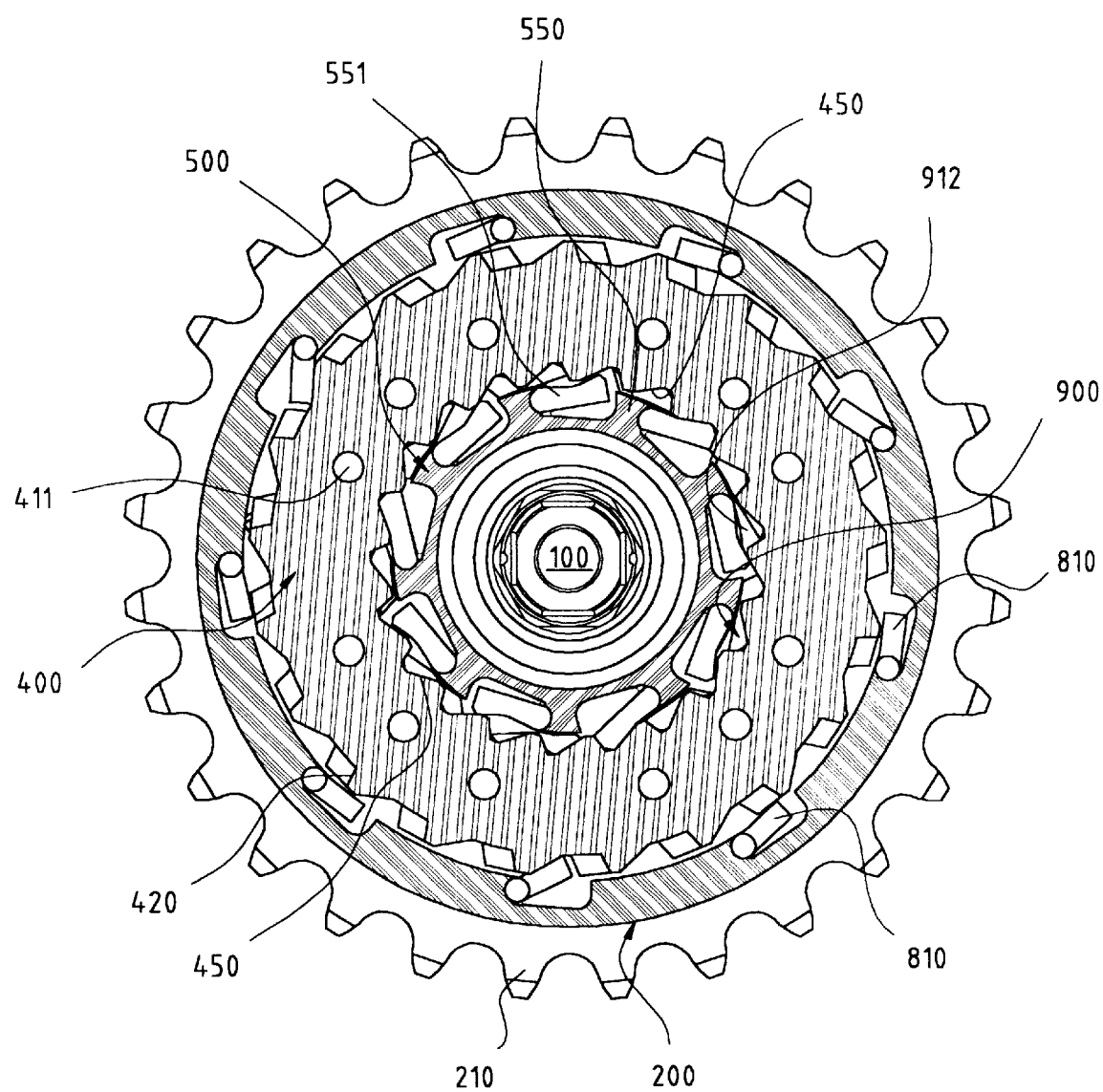
Figure 11:
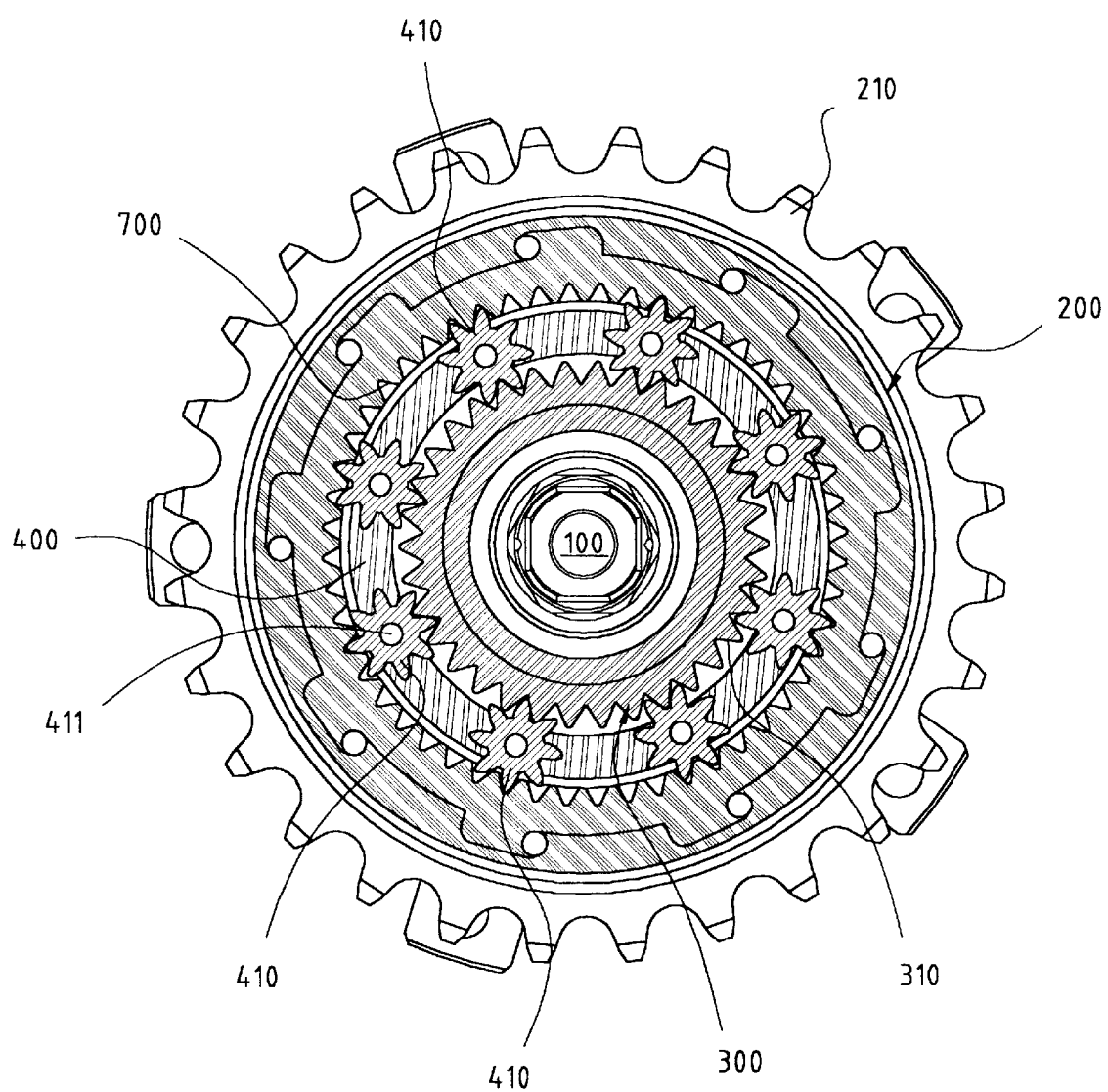
FIG. 11 is a section view cut along line D—D of FIG.7.

In the state where the changing lever 561 is in position, the lever gear 560 of the changing lever 561 rotates the stopper changing ring 900 with predetermined angle, so that the second one-way stoppers 551 of the fixing housing 500 are entangled with the inner ratchet teeth portion 620 of the changing gear ring 600 and the ratchet teeth 450 of the carrier 400 as shown in FIGS. 5, 10A and 10B.

When the pedal shaft 100 is driven forward in this state, the sun gear 300 rotates forward together with the pedal shaft 100.

Thus, the sun gear 300 transfers the forward rotation force to the carrier 400 with being engaged with the planetary gears 410 of the carrier 400.

That is, because the first one-way stoppers 810 of the ratchet changing ring 800 of the sprocket housing 200 are entangled with the ratchet teeth 420 of the carrier 400 and the outer ratchet teeth portion 610 of the changing gear ring 600, the sun gear 300 rotates the carrier 400 forward with being engaged with the planetary gears 410 of the carrier 400.

Here, the forward rotation of the carrier 400 rotates the ratchet changing ring 800 of the sprocket housing 200 forward, so that the driving force is transferred to the rear wheel connected to the driving chain sprocket 210 of the sprocket housing 200 by a chain, thereby traveling the bicycle forward.

Figure 7:
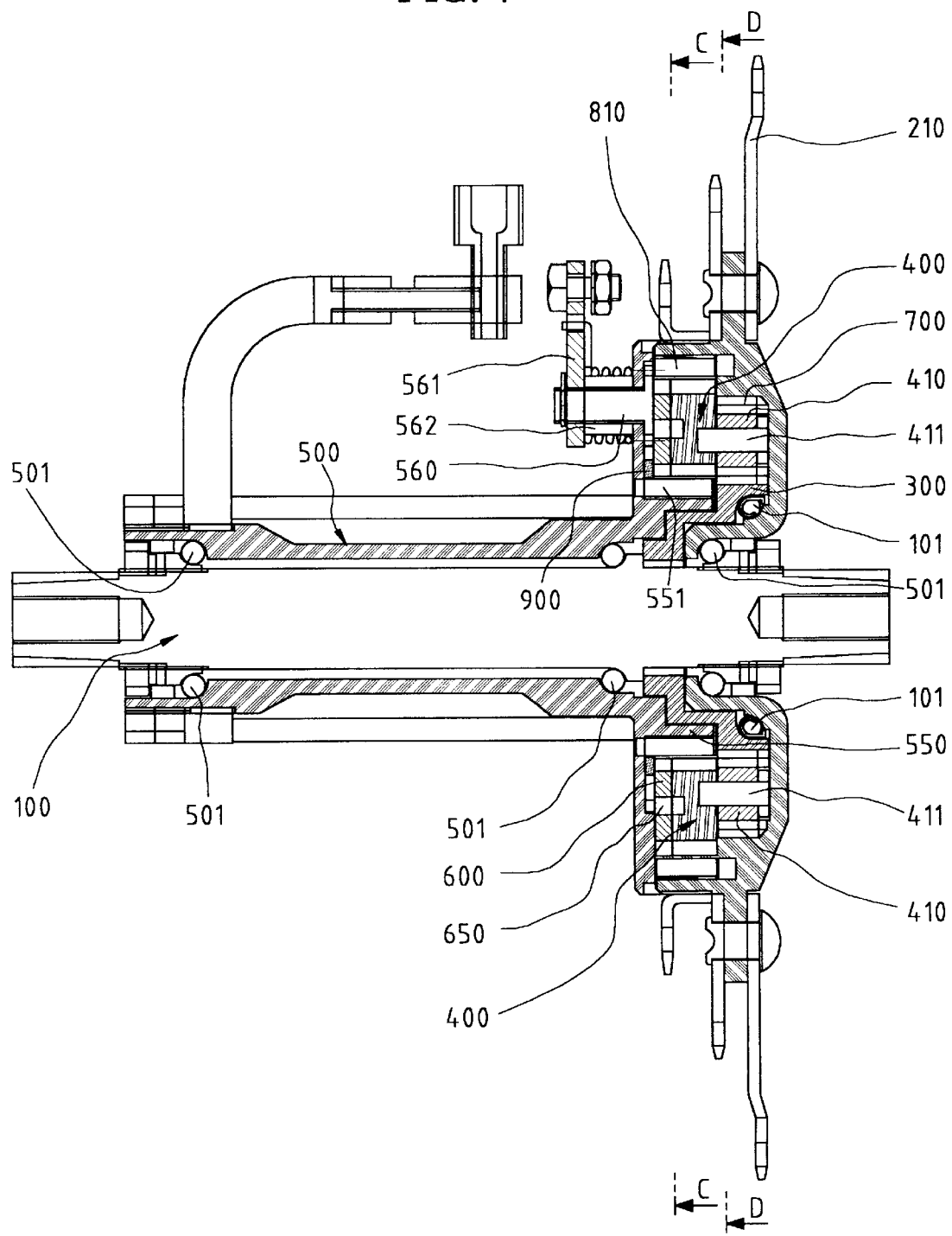
FIG. 7 is a section view showing an apparatus for changing rotation of a pedal shaft for a bicycle according to another embodiment of the present invention.

As shown in FIGS. 7 and 10A, the second one-way stoppers 551 of the fixing housing 500, which are protruded, are entangled with the inner ratchet portion 620 of the changing gear ring 600. However, the inner ratchet teeth portion 620 of the changing gear ring 600 and the ratchet teeth 450 of the carrier 400 move slidably over the second one-way stoppers 551 of the fixing housing 500.

Thus, the changing gear ring 600 and the carrier 400 can directly rotate the sprocket housing 200 forward.

On the other hand, when the pedal shaft 100 is driven rearward, the sun gear 300 rotates rearward together with the pedal shaft 100.

Thus, the sun gear 300 transfers rearward driving force to the carrier 400 and the changing gear ring 600 with being engaged with the planetary gears 410 of the carrier 400.

Here, the inner ratchet teeth portion 620 of the changing gear ring 600 are entangled with the second one-way stoppers 551 of the fixing housing 500, to inhibit the rearward rotation of the changing gear ring 600. As a result, the rearward rotation of the carrier 400 is checked.

As shown in FIG. 10B, the inner ratchet teeth portion 620 of the changing gear ring 600 and the ratchet teeth 450 of the carrier 400 are entangled with the second oneway stoppers 551 of the fixing housing 500, so the rearward rotation of the carrier 400 is checked.

When the rearward rotation of the carrier 400 is checked, the sun gear 300 of the pedal shaft 100 rotates the planetary gears 410 of the carrier 400 forward.

As the planetary gears 410 of the carrier 400 rotate the ring gear 700 of the sprocket housing 200 forward, driving force is transferred to the rear wheel connected to the driving sprocket 210 of the sprocket housing 200 by a chain, thereby traveling the bicycle forward.

Also, as shown in FIG. 4A or 5, the bicycle can be pulled rearward with the first one-way stoppers 810 of the ratchet changing ring 800 of the sprocket housing 200 are entangled with the ratchet teeth 420 of the carrier 400 and the outer ratchet teeth portion 610 of the changing gear ring 600.

When the bicycle is pulled rearward in this state, the rearward driving force is transferred to the driving chain sprocket 210 connected to the rear wheel by a chain, so the ratchet changing ring 800 of the sprocket housing 200 rotates rearward.

Here, the carrier 400 and the changing gear ring 600 are coupled to be rotatable at predetermined angle, and the ratchet teeth 420 of the carrier 400 has approximately the same radius as that of the outer ratchet teeth portion 610 of the changing gear ring 600, and the outer ratchet teeth portion 610 of the changing gear ring 600 has a gentle grade.

Accordingly, as shown in FIG. 4B, the ratchet teeth portion 610 of a changing gear ring 600 with gentle grade of both direction, pushes the first one-way stoppers 810 of a ratchet changing ring 800 outer direction (dotted line arrow), thereby a sprocket housing move over the ratchet teeth portion in the direction of solid line arrow of FIG. 4B. Therefore, due to the fact that the rotation of the ratchet changing ring 800 is not transferred to the pedal shaft 100, the bicycle can be pulled without a load.

The sprocket housing 200 rotates rearward in company with the rearward rotation of the driving chain sprocket 210.

As the sprocket housing 200 rotates rearward, the ring gear 700 of the sprocket housing 200 rotates the planetary gears 410 of the carrier 400, so that the rotation of the planetary gears rotate the sun gear 300 forward, and the rotation of the sun gear 300 rotates the pedal shaft 100 forward. It means the bicycle can be pulled rearward that the pedal shaft 100 rotates rearward.

Also, as shown in FIGs. 10A and 10B, when the sprocket housing 200 of the driving changing sprocket 210 rotates rearward by pulling rearward the bicycle, the first one-way stoppers 810 of the ratchet changing ring 800 of the sprocket housing 200 rotate rearward the ratchet teeth 420 of the carrier 400 and the outer ratchet teeth portion 610 of the changing gear ring 600.

Here, the ratchet teeth 450 of the carrier 400 and the inner ratchet portion 620 of the changing gear ring 600 inhibit the rearward rotation of the second one-way stoppers 551 of the fixing housing 500. However, because the inner ratchet teeth portion 620 of the changing gear ring 600 has a gentle grade, the carrier 400 and the changing gear ring 600 can rotate rearward without entanglement with the second one-way stoppers 551 of the fixing housing 500.

Thus, as the carrier 400 rotates rearward, the planetary gears 410 of the carrier 400 rotate the sun gear 300 rearward, and the sun gear 300 rotates the pedal shaft 100 rearward. That is, it means the bicycle can be pulled rearward that the pedal shaft 100 rotates rearward without a load.

Industrial Applicability

As described above, in an apparatus for changing rotation of a pedal shaft for a bicycle according to the present invention, in which a changing gear ring is coupled with a carrier to be rotatable with predetermined angle, stoppers of a fixing housing, operated by a changing lever from the outside, control the changing gear ring, so that the carrier is indirectly controlled by the changing gear ring without a load, thereby reducing overload among parts and damages caused by the overload.

Also, when a bicycle is pulled rearward, the rearward driving force of a sprocket housing of a driving chain sprocket, operates the carrier and the changing ring, so that the rotation control a first and second one-way stoppers, the pedal shaft rotates rearward, then the bicycle can be pulled rearward without a load.

What is claimed is:

1. An apparatus for changing rotation of a pedal shaft for a bicycle, comprising:

the pedal shaft to which a sun gear is fixed;

a sprocket housing coupled with the pedal shaft to be freely rotatable, and having a ring gear and first one-way stoppers in a cylindrical inner circumference;

a carrier having outer ratchet teeth formed at an outer circumference, and having planetary gears engaged with the ring gear of the sprocket housing and the sun gear of the pedal shaft, for enabling the sprocket housing to be rotatable forward and rearward;

a changing gear ring coupled at a side of the carrier, and having an inner ratchet teeth portion in an inner circumference and an outer ratchet teeth portion in an outer circumference, the outer ratchet teeth portion having a gentle grade in both directions compared with the outer ratchet teeth of the carrier;

a fixing housing having second one-way stoppers for rotating the changing gear ring and the carrier rearward or for stopping the rearward rotation; and a stopper changing ring capable of controlling the second one-way stoppers of the fixing housing.

2. The apparatus of claim 1, wherein the carrier and the changing gear ring are coupled to be rotatable with a predetermined rotatable angle.

3. The apparatus of claim 1, wherein the outer ratchet teeth portion of the changing gear ring has approximately the same radius as that of the outer ratchet teeth formed at the outer circumference of the carrier.

4. The apparatus of claim 3, wherein the outer ratchet teeth portion of the changing gear ring and the outer ratchet teeth formed at the outer circumference of the carrier elastically support the first one-way stoppers of the sprocket housing.

5. The apparatus of claim 1, wherein the inner ratchet teeth portion of the changing gear ring has approximately the same radius as that of an inner circumference of the carrier, and has a gentle grade compared with inner ratchet teeth of the carrier.

* * * * *